US009268878B2

(12) United States Patent
Bieniosek et al.

(10) Patent No.: US 9,268,878 B2
(45) Date of Patent: Feb. 23, 2016

(54) ENTITY CATEGORY EXTRACTION FOR AN ENTITY THAT IS THE SUBJECT OF PRE-LABELED DATA

(75) Inventors: Michael Bieniosek, Woodinville, WA (US); Franco Salvetti, San Francisco, CA (US); Giovanni Lorenzo Thione, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 360 days.

(21) Appl. No.: 12/820,349

(22) Filed: Jun. 22, 2010

(65) Prior Publication Data
US 2011/0314018 A1 Dec. 22, 2011

(51) Int. Cl.
*G06F 17/30* (2006.01)

(52) U.S. Cl.
CPC .... *G06F 17/30943* (2013.01); *G06F 17/30707* (2013.01)

(58) Field of Classification Search
CPC .................................. G06F 17/30; G06F 17/00
See application file for complete search history.

(56) References Cited

U.S. PATENT DOCUMENTS

| 5,418,717 | A * | 5/1995 | Su et al. ............................ 704/9 |
| 6,317,708 | B1 * | 11/2001 | Witbrock et al. .................. 704/9 |
| 6,363,301 | B1 * | 3/2002 | Tackett et al. ................. 700/246 |
| 6,505,157 | B1 * | 1/2003 | Elworthy ....................... 704/257 |
| 7,519,725 | B2 * | 4/2009 | Alvarez et al. ................ 709/232 |
| 7,558,778 | B2 | 7/2009 | Carus et al. |
| 7,580,830 | B2 * | 8/2009 | Al-Onaizan et al. .............. 704/2 |
| 7,580,926 | B2 * | 8/2009 | Kapur et al. |
| 7,587,309 | B1 * | 9/2009 | Rohrs et al. ..................... 704/10 |
| 7,653,531 | B2 * | 1/2010 | Sneddon et al. ................ 704/10 |
| 7,660,468 | B2 * | 2/2010 | Gokturk et al. ............... 382/224 |
| 7,673,236 | B2 * | 3/2010 | Tang ............................ 715/256 |
| 7,725,363 | B2 * | 5/2010 | Speers et al. ................ 705/26.5 |
| 7,774,491 | B2 * | 8/2010 | Alvarez et al. ............... 709/232 |
| 7,814,085 | B1 * | 10/2010 | Pfleger et al. ................. 707/708 |
| 7,890,505 | B1 * | 2/2011 | Alspector et al. ............. 707/731 |
| 8,036,945 | B2 * | 10/2011 | Speers et al. ................ 705/26.1 |
| 2005/0108200 | A1 * | 5/2005 | Meik ................... G06F 17/3071 |
| 2005/0165819 | A1 * | 7/2005 | Kudoh et al. ................. 707/101 |
| 2005/0210009 | A1 * | 9/2005 | Tran ................................. 707/3 |

(Continued)

OTHER PUBLICATIONS

Vercoustre, Anne-Marie, James A. Thom, and Jovan Pehcevski. "Entity ranking in Wikipedia." In Proceedings of the 2008 ACM symposium on Applied computing, pp. 1101-1106. ACM, 2008.*

(Continued)

*Primary Examiner* — Farhan Syed
(74) *Attorney, Agent, or Firm* — Dave Ream; Jim Ross; Micky Minhas

(57) ABSTRACT

Summaries of entities (e.g., people, places, things, concepts, etc.) may provide additional useful information to user. For example, a search engine may provide a summary of an entity within search results. A category (e.g., "writer", "politician", etc.) of the entity that is short and concise may be advantageous to provide within a summary of the entity. The category may allow a user to quickly determine whether the information of the entity relates to the intended entity (e.g., search results of an entity as "a writer" vs. search results of an entity as "a politician"). Potential categories and summary text may be extracted from pre-labeled data. The potential categories and summary text may be intersected to determine a set of candidate categories that may be ranked. An entity category having a desired ranked may be determined as the entity category that describes the entity in a desired way.

18 Claims, 9 Drawing Sheets

(56) References Cited

U.S. PATENT DOCUMENTS

| | | | |
|---|---|---|---|
| 2006/0089924 | A1 | 4/2006 | Raskutti et al. |
| 2007/0027672 | A1* | 2/2007 | Decary ................ G06F 17/278 704/7 |
| 2007/0073704 | A1* | 3/2007 | Bowden et al. ................. 707/10 |
| 2007/0136680 | A1* | 6/2007 | Skrenta ......................... 715/780 |
| 2007/0198353 | A1* | 8/2007 | Behringer et al. ............. 705/14 |
| 2007/0208719 | A1* | 9/2007 | Tran ................................. 707/3 |
| 2007/0299708 | A1* | 12/2007 | Ouderkirk et al. ................ 705/8 |
| 2008/0104506 | A1* | 5/2008 | Farzindar ....................... 715/254 |
| 2008/0301120 | A1* | 12/2008 | Zhu .................. G06F 17/30613 |
| 2009/0119255 | A1* | 5/2009 | Frank ................. G06F 17/3087 |
| 2009/0132592 | A1* | 5/2009 | Schiller ..................... 707/104.1 |
| 2009/0138616 | A1* | 5/2009 | Alvarez et al. ................ 709/235 |
| 2010/0036653 | A1* | 2/2010 | Kim et al. .......................... 704/3 |
| 2011/0119243 | A1* | 5/2011 | Diamond et al. ............. 707/706 |
| 2011/0222771 | A1* | 9/2011 | Cimpoi et al. ................. 382/176 |
| 2011/0314018 | A1* | 12/2011 | Bieniosek et al. ............ 707/737 |
| 2012/0047145 | A1* | 2/2012 | Heidasch ....................... 707/741 |

OTHER PUBLICATIONS

McDonald, Daniel M., and Hsinchun Chen. "Summary in context: Searching versus browsing." ACM Transactions on Information Systems (TOIS) 24, No. 1 (2006): 111-141.*

Kettler, Brian, James Starz, William Miller, and Peter Haglich. "A template-based markup tool for semantic web content." In the Semantic Web-ISWC 2005, pp. 446-460. Springer Berlin Heidelberg, 2005.*

Wong, Tak-Lam, and Wai Lam. "Learning to extract and summarize hot item features from multiple auction web sites." Knowledge and Information Systems 14, No. 2 (2008): 143-160.*

Pehcevski, Jovan, James A. Thom, Anne-Marie Vercoustre, and Vladimir Naumovski. "Entity ranking in Wikipedia: utilising categories, links and topic difficulty prediction." Information retrieval 13, No. 5 (2010): 568-600.*

Ponzetto; et al., "Knowledge Derived From Wikipedia for Computing Semantic Relatedness"—Published Date: Oct. 2007, http://www.eml-research.de/english/homes/ponzetto/pubs/jair07.pdf.

Thom; et al., "Use of Wikipedia Categories in Entity Ranking"—Published Date: 2008 http://www-rocq.inria.fr/~vercoust/PAPERS/adcs07-final.pdf.

Ponzetto; et al., "Deriving a Large Scale Taxonomy from Wikipedia"—Published Date: 2007 http://www.eml-research.de/english/research/nlp/papers/ponzetto07b.pdf.

Weale, Timothy, "Utilizing Wikipedia Categories for Document Classification"—Published Date: 2006 ftp://ftp.cse.ohio-state.edu/pub/tech-report/2008/TR14.pdf.

Kazama; et al., "Exploiting Wikipedia as External Knowledge for Named Entity Recognition"—Published Date: Jun. 2007, http://www.aclweb.org/anthology-new/D/D07/D07-1073.pdf.

Nakayama; et al., "Wikipedia Link Structure and Text Mining for Semantic Relation Extraction"—Published Date: 2008, http://ftp.informatik.rwth-aachen.de/Publications/CEUR-WS/Vol-334/paper-05.pdf.

* cited by examiner

ENTITY CATEGORY EXTRACTION FOR AN ENTITY THAT IS THE SUBJECT OF PRE-LABELED DATA

BACKGROUND

The internet provides a rich source of information that users may search, consume, and/or share with others. For example, users may search for information regarding entities, such as people, places, things, blogs, companies, ideas, concepts, and/or a wide variety of other information. To enhance a users experience in searching and/or consuming content relating to entities, it may be advantageous to provide additional information, such as summaries, relating to the entities. In one example, a summary of an entity may comprise a category providing a short and succinct description of the entity (e.g., an entity of "Mr. Dan" may have a summary comprising a category of "writer", which may aid a user in distinguishing "Mr. Dan" the "writer" from another Mr. Dan who is a politician). Given the vast amount of information available on the internet, however, deficiencies still remain regarding assisting users in finding relevant content.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for determining an entity category, at times making use of pre-labeled data, are disclosed herein. Entities may be interpreted as, among other things, people, places, things, blogs, companies, ideas, concepts, and/or a wide variety of ideas that may be found in an encyclopedia, for example. Pre-labeled data may be interpreted as information (e.g., web pages, articles, text, blogs, data stored in a database, and/or other electronic data) that may comprise pre-labeled categories associated with one or more entities. For example, pre-labeled data may be a web page comprising an encyclopedia type article about an entity, such as clouds, where that page also includes pre-labeled or pre-existing categories about that entity, such as weather, moisture, sun, rain, climate, etc.

Given that many categories may exist for a particular entity (e.g., an entity of "Mr. Dan" may have associated categories of both "writer" and "politician" (because Mr. Dan is both a writer and politician and/or there is a first Mr. Dan that is a writer and second Mr. Dan that is a politician)) and/or that many categories may be suitable or applicable to a particular entity, it may be desirable to weed out certain (potentially less relevant) categories, rank categories and/or otherwise select more suitable (potentially more relevant categories) for an entity. Accordingly, in an effort to achieve the same, as provided herein, one or more potential categories and summary text relating to an entity may be extracted from pre-labeled data. For example, pre-labeled data may comprise an article regarding clouds. Pre-labeled categories within the article may be extracted as potential categories relating to an entity of clouds. A portion of text within the article (e.g., a first occurring sentence, a first occurring paragraph, the entire article, etc.) may be extracted as summary text relating to the entity of clouds.

For respective potential categories, words of a potential category (e.g., category words) may be intersected with words within the summary text (e.g., summary words) to determine a set of candidate categories. That is, a potential category having a category word that appears in the summary text may be included in the set of candidate categories. In this way, potential categories may be filtered based upon the summary text. To take into account variations of words (e.g., singular vs. plural form), morphological analysis may be performed upon category words to generate variation category words that may be intersected with summary words within the summary text to determine the set of candidate categories. Additionally, syntactical features of the summary text may be determined based upon natural-language processing techniques (e.g., part-of-speech tagging, phrase chunking, etc.). One or more potential categories may be excluded from the set of candidate categories based upon the syntactical features.

The set of candidate categories may be ranked based upon one or more ranking features to generate a ranked set of candidate categories. For example, candidate categories may be ranked based upon a position within summary text feature (e.g., a position of one or more candidate words of a candidate category within the summary text in relation to verbs, prepositions, a first word within the sentence, etc.), display size feature (e.g., a text width of a candidate query, a font size, a bold format, etc.), and/or other candidate features. In one example, a candidate category may be assigned a desired rank based upon one or more candidate category words of the candidate category occurring after verbs (e.g., "is" or "was"). In another example, a candidate category may be assigned an undesired rank based upon one or more candidate category words of the candidate category occurring after prepositions (e.g., "from" or "in"). In this way, an entity category having a desired rank may be determined from the ranked set of candidate categories. In one example, the entity category may be presented as a search query completion suggestion. In another example, the entity category may be provided within a summary of an entity within a search result page.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
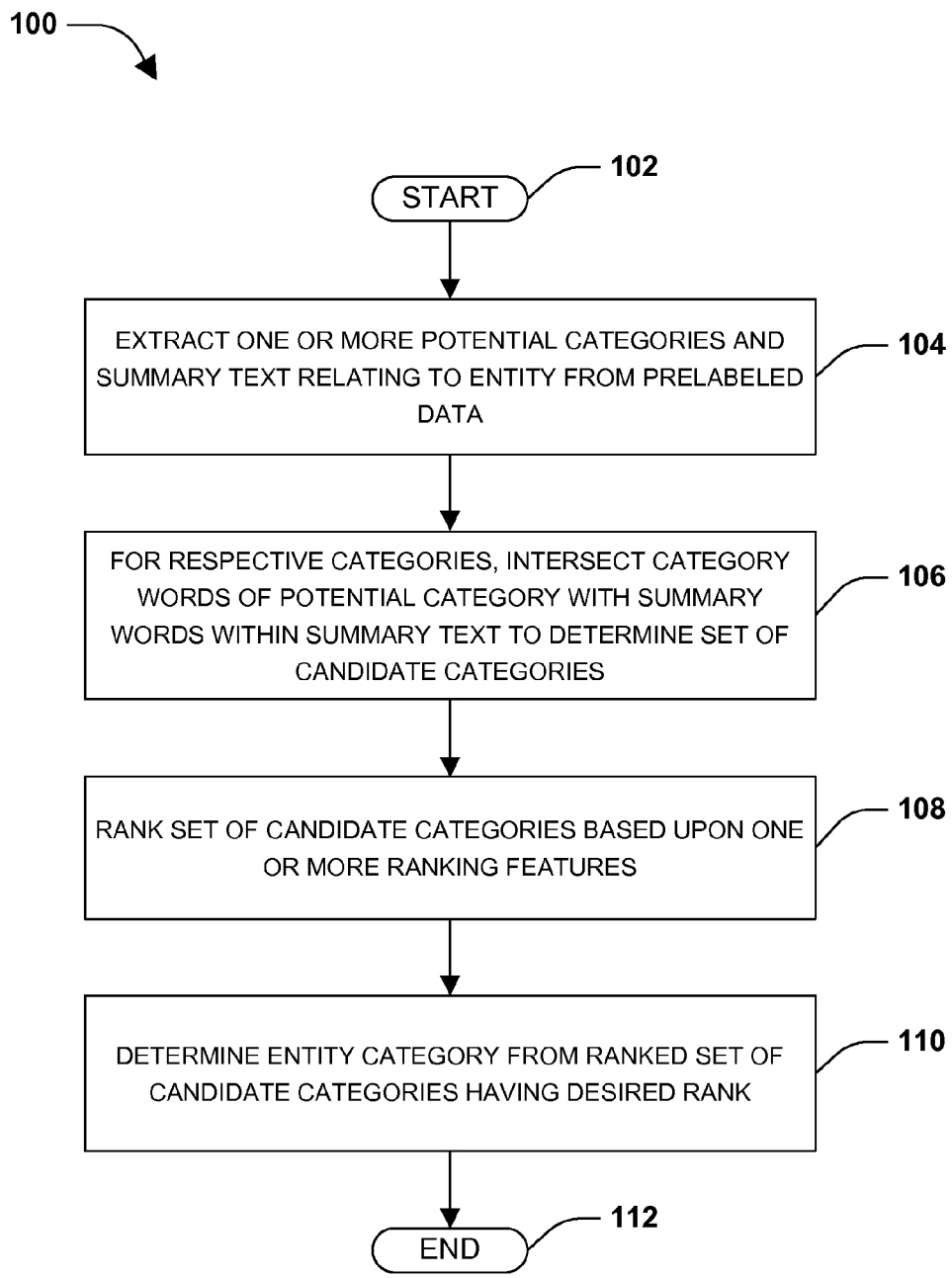
FIG. 1 is a flow chart illustrating an exemplary method of determining an entity category.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

When providing a summary of an entity, such as people, places, things, and/or concepts, it may be advantageous to provide a category description of the entity within the summary. The category may comprise a short and succinct description of the entity. For example, a summary of a person (an entity of "Mr. Dan") may have a category of "politician". The category may help a user to understand what entity the summary references (e.g., "Mr. Dan" the "politician", as opposed to "Mr. Dan" the "writer"). Additionally, category information may be used to aid users when searching for information relating to an entity. For example, when a user begins to type a search query of an entity (e.g., "Marquette"), a category may be provided as a search query completion suggestion (e.g., "a city in Kansas") to aid the user in narrowing the search to a desired entity (e.g., Marquette in Kansas, as opposed to Marquette in Michigan). Thus, it may be advantageous to leverage pre-labeled data having pre-labeled categories and summary text to determine an entity category that is short, concise, and highly relevant to the entity and to content that a user may be interested in consuming.

Accordingly, one or more systems and/or techniques for determining an entity category are provided herein. In particular, potential categories (e.g., categories about an entity pre-labeled by manual input) and summary text (e.g., a summary sentence, paragraph, and/or article summarizing an entity) may be extracted from pre-labeled data (e.g., a web page article regarding an entity). The potential categories and the summary text may be compared (e.g., intersected) to filter out undesirable potential categories. In this way, a set of candidate categories may be determined. The set of candidate categories may be ranked based upon ranking features (e.g., category word location within the summary text, category word size, etc.). An entity category having a desired rank may be determined from the ranked set of candidate categories (e.g., an entity category having a highest rank). The entity category may be used within a summary and/or within a search engine as a search query completion suggestion, for example.

One embodiment of determining an entity category is illustrated by an exemplary method 100 in FIG. 1. At 102, the method starts. At 104, one or more potential categories and summary text relating to an entity may be extracted from pre-labeled data. In one example, pre-labeled data may correspond to a web page article comprising a textual description of an entity (e.g., a portion of the textual description may be extracted as summary text, such as a first occurring sentence or a first occurring paragraph), and a set of pre-labeled categories relating to the entity. It may be appreciated that a potential category may comprise one or more category words (e.g., "Novel", "by Mr. Dan", "about", "British spies", "Novel by Mr. Dan" and/or other category words), where a category word may comprise a single word, number and/or symbol and/or a multiple words, numbers and/or symbols (e.g., a phrase of one or more words, one or more numbers and/or one or more symbols). It may be appreciated that category words may overlap or have overlapping terms (e.g., category word "Novel" and category word "Novel by Mr. Dan"). It may be appreciated that summary text may comprise one or more summary words (e.g., "Dan" "born in 1982" "raced sports cars"), where a summary word may comprise a single word, number and/or symbol and/or multiple words, numbers and/or symbols (e.g., a phrase of one or more words, one or more numbers and/or one or more symbols).

At 106, for respective potential categories, category words of a potential category may be intersected with summary words within the summary text to determine a set of candidate categories. For example, a potential category "raced sports cars" may be compared with summary text "Dan liked to race sports cars". Because the category words "raced", "sports", "cars", and/or variations thereof occur within the summary text, the potential category "raced sports cars" may be included within the set of candidate categories. In contrast, a potential category "born in 1982" may be compared with the summary text "Dan liked to race sports cars". Because the category words "born in" and "1982" do not occur within the summary text, the potential category "born in 1982" may be excluded from the set of candidate categories.

Because a word may be used in multiple forms (e.g., singular vs. plural format), morphological or other analysis may be performed upon category words of a potential category to generate variation category words (e.g., race may be also be analyzed instead of merely raced and vice versa). The variation category words of the potential category may be intersected with summary words within the summary text to determine the set of candidate categories (e.g., race may also be intersected with summary words instead of merely intersecting raced with summary words). Additionally, syntactical features of the summary text may be determined based upon natural-language processing techniques, such as part-of-speech tagging and/or phrase chunking. Potential categories may be excluded and/or included from/to the set of candidate categories based upon the syntactical features.

At 108, the set of candidate categories may be ranked based upon one or more ranking features. For example, ranking features may comprise a display size feature of category words within the summary text; a position within summary text feature corresponding to relative locations of category words in relation to other words (e.g., verbs, prepositions, etc.) within the summary text; etc. In one example, a desired rank (e.g., a high rank) may be assigned to candidate categories having category words occurring after verbs, such as "is" or "was", within the summary text. In another example, an undesired rank (e.g., a low rank) may be assigned to candidate categories having category words occurring after prepositions, such as "from" or "in", within the summary text. In this example, category words occurring after verbs may comprise more relevant and desired information about the entity than category words occurring after prepositions. For example, when analyzing the text: Mr. Dan is a "carpenter" from "Ohio", the fact that Mr. Dan is a "carpenter" may be more relevant and descriptive than the fact that Mr. Dan is from "Ohio".

At 110, an entity category having a desired rank may be determined from the ranked set of candidate categories. For example, a candidate category having a highest rank may be determined as the entity category. In one example, the entity category may be presented within a search result page in response to a user search query corresponding to the entity. In another example the entity category may be presented within a summary of the entity. In another example the entity category may be provided as a search query completion suggestion in response to user input comprising at least part of the entity's name as a user search query. At 112, the method ends.

In another example of determining an entity category corresponding to an entity, one or more potential categories may be extracted from an article of a web page. Summary text may be extracted from at least a portion of a first paragraph of the article. In one example, the web page, or a portion thereof, may be formatted or written in a certain style such that summary text can be extracted from the first paragraph, or a portion thereof, of the web page, for example (and the same may be true where summary text is obtained from additional/alternative portions the page). For respective potential categories, category words of a potential category may be intersected with summary words within the summary text to determine a set of candidate categories. Potential categories may be excluded from the set of candidate categories based upon syntactical features of the summary text. The set of candidate categories may be ranked based upon at least one of a position within summary text feature (e.g., a category word occurring after a preposition vs. a category word occurring after a verb) and a display size feature (e.g., font size of category words, length of category words, and/or other size features of category words within the summary text). An entity category having a desired rank may be determined from the ranked set of candidate categories. In this way, an entity category providing a short and concise summary of the entity may be determined.

Figure 2:
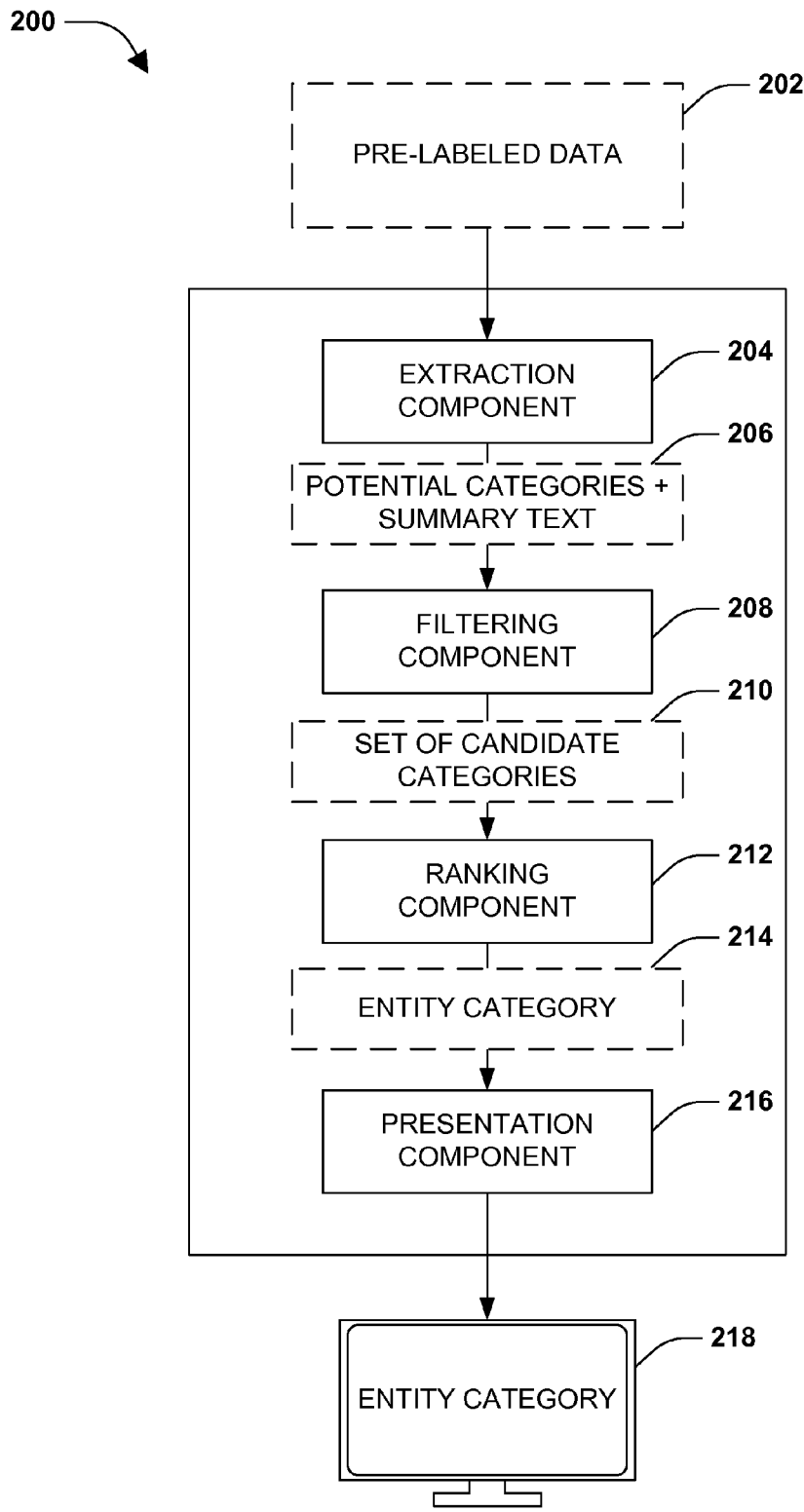
FIG. 2 is a component block diagram illustrating an exemplary system for determining an entity category.

FIG. 2 illustrates an example of a system 200 configured to determine an entity category 214. The system 200 may comprise an extraction component 204, a filtering component 208, a ranking component 212, and/or a presentation component 216. The extraction component 204 may be configured to extract one or more potential categories and summary text 206 relating to an entity from pre-labeled data 202. The filtering component 208 may be configured to intersect category words of potential categories with summary words within the summary text to determine a set of candidate categories 210. The filtering component 208 may be configured to perform morphological or other analysis upon category words of a potential category to generate variation category words. The filtering component 208 may intersect the variation category words of the potential category with summary words within the summary text to determine the set of candidate categories 210. Additionally, the filtering component 208 may be configured to determine syntactical features of the summary text based upon natural-language processing techniques, such as part-of-speech tagging and/or phrase chunking. The filtering component 208 may be configured to exclude and/or include potential categories from/to the set of candidate categories 210 based upon the syntactical features.

The ranking component 212 may be configured to rank the set of candidate categories 210. In one example, the ranking component 212 may assign a desired rank to a candidate category based upon one or more category words of the candidate category occurring after a verb, such as "is" or "was". In another example, the ranking component 212 may assign an undesired rank to a candidate category based upon one or more category words of the candidate category occurring after a preposition, such as "from" or "in". In this example, category words occurring after verbs may comprise more relevant and desired information about the entity than category words occurring after prepositions. The ranking component 212 may be configured to determine the entity category 214 having a desired rank from the ranked set of candidate categories. The presentation component may be configured to present the entity category 218 in response to user input comprising at least part of the entity's name.

It will be appreciated that components of the system 200 can be applied or enabled to varying degrees. For example, the ranking component 212 and/or the filtering component 208 may be throttled up or down to have a greater or lesser impact within the system 200. For example, if the ranking component 212 is throttled down to reduce (or eliminate) its effect, the entity category 214 may be determined mainly (or completely) based upon the implementation of the filtering component 208. Similarly, if the filtering component 208 is throttled down to reduce (or eliminate) its effect, the entity category 214 may be determined mainly (or completely) based upon the implementation of the ranking component 212.

Figure 3:
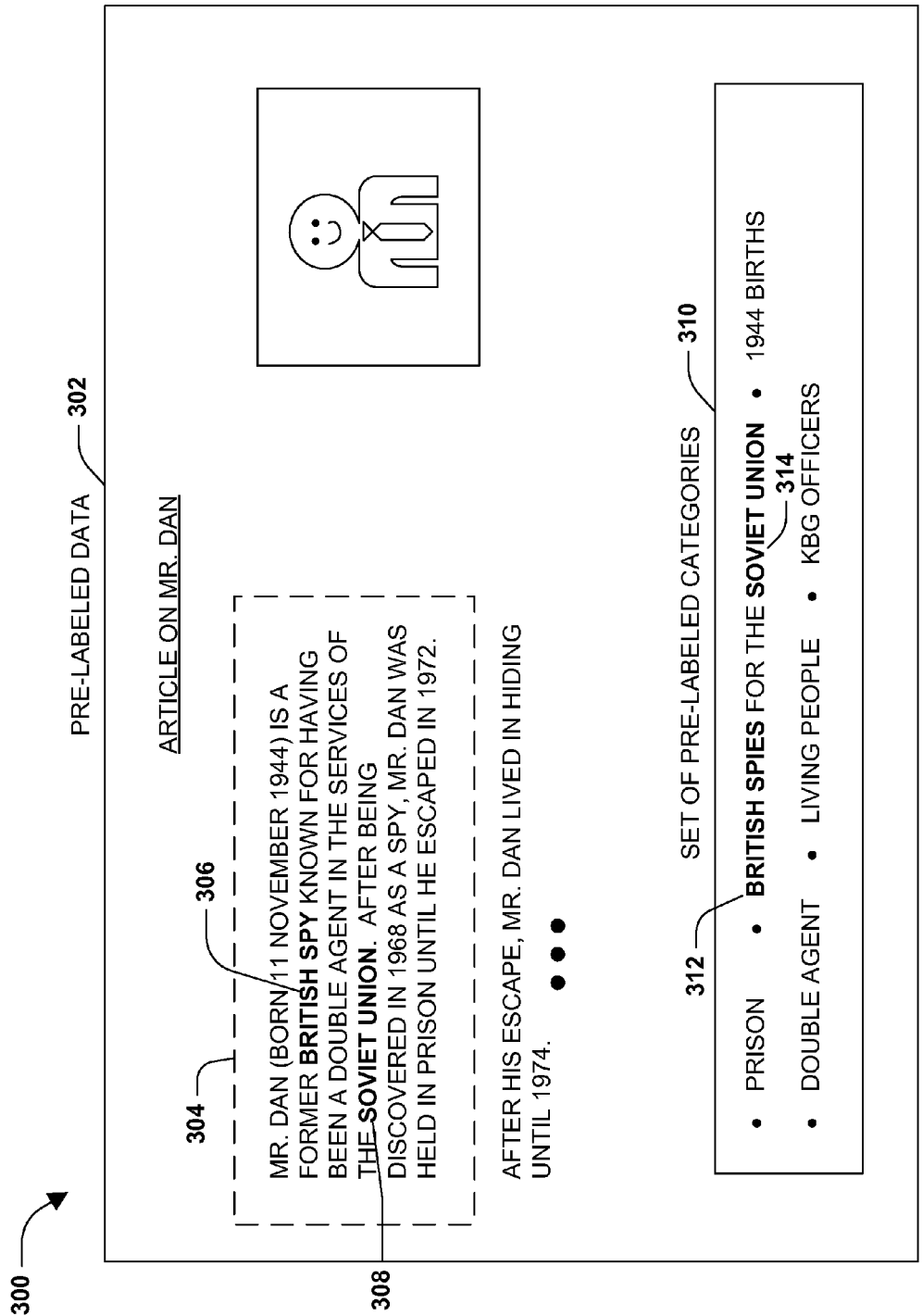
FIG. 3 is an illustration of an example of pre-labeled data.

FIG. 3 illustrates an example 300 of pre-labeled data 302. The pre-labeled data 302 may correspond to a website that provides articles on various topics, such as entities (e.g., people, places, things, concepts, etc.). For example, the pre-labeled data 302 may correspond to an article on Mr. Dan (an entity of Mr. Dan). The article may comprise text describing Mr. Dan, an image of Mr. Dan, a set of pre-labeled categories 310, and/or other information relating to Mr. Dan. A portion of the text may be extracted as summary text 304. For example, the first paragraph may be extracted as summary text 304. Additionally, the set of pre-labeled categories 310 may be extracted as one or more potential categories.

It may be appreciated that a filtering component (e.g., filter component 208 of FIG. 2) may intersect category words of potential categories with summary words within the summary text 304 to determine a set of candidate categories. For example, "living people", "KBG officers", and/or other potential categories may be excluded from a set of candidate categories because category words of the potential categories do not match summary words within the summary text 304. In contrast, because category word "British spies" 312 and category word "Soviet Union" 314 of a potential category "British spies for the Soviet Union" do match summary words within the summary text 304, "British spies for the Soviet Union" may be included in the set of candidate categories because at least some of the category words match summary words within the summary text 304. For example, "British spies" 312 may match "British Spy" 306 and "Soviet Union" 314 may match "Soviet Union" 308. Other potential categories, such as "prison", "1944 births", and/or "double agent" may likewise be included within the set of candidate categories, for example.

Figure 4:
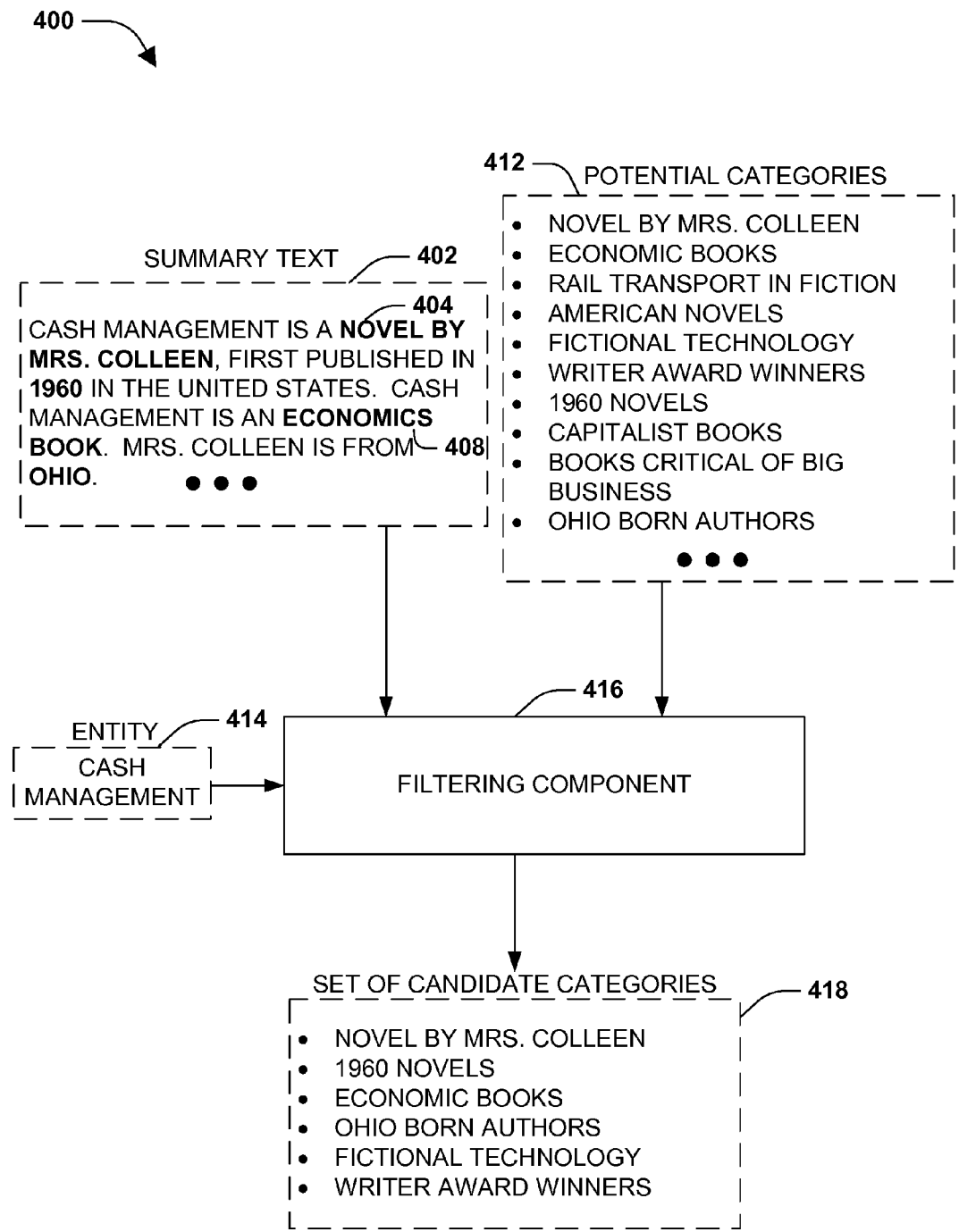
FIG. 4 is an illustration of an example of determining a set of candidate categories for an entity.

FIG. 4 illustrates an example 400 of determining a set of candidate categories 418 for an entity of Cash Management 414, where a filtering component 416 configured to perform this functionality is implemented to accomplish the same in this example. Summary text 402 relating to the entity of Cash Management 414 (a novel having a title Cash Management) may have been extracted from pre-labeled data. Additionally, potential categories 412 relating to Cash Management 414 may have been extracted from pre-labeled data. It may be advantageous to determine one or more candidate categories that may be more, or the most in the case of a single candidate category, relevant and descriptive of Cash Management 414. The filtering component 416 may be configured to filter out potential categories by intersecting category words of potential categories (e.g., "Ohio born", "authors" may be category words of a potential category "Ohio born authors") with summary words of the summary text 402 (e.g., "economics book", "Ohio", "published", and/or other words/phrases may be summary words) to generate the set of candidate categories 418.

In one example, the filtering component 416 may intersect the potential category "novel by Mrs. Colleen" with summary words within the summary text 402. The category words of the potential category "novel by Mrs. Colleen" directly match the summary word(s) "novel by Mrs. Colleen" 404, and thus the potential category "novel by Mrs. Colleen" may be included within the set of candidate categories 418. The filtering component 416 may intersect the potential category "economic books" with summary words within the summary text 402. Morphological analysis may be performed upon the category word "economic" and the category word "books" to create variation category words "economics" and "book". The category words and/or variation category words may match summary word(s) "economics book" 408, and thus the potential category "economic books" may be included within the set of candidate categories 418.

The filtering component 416 may intersect the potential category "rail transport in fiction" with summary words within the summary text 402. The category words of the potential category "rail transport in fiction" (e.g., "rail transportation", "fiction", etc.) may not match summary words within the summary text 402. Thus, the potential category "rail transportation in fiction" may be excluded from the set of candidate categories 418. In this way, the set of candidate categories 418 may be determined based upon intersecting the potential categories 412 (or portions/words thereof) with the summary text 402. It may be appreciated that additional logic may be implemented, such as syntactical features that may be utilized to determine the set of candidate categories 418.

Figure 5:
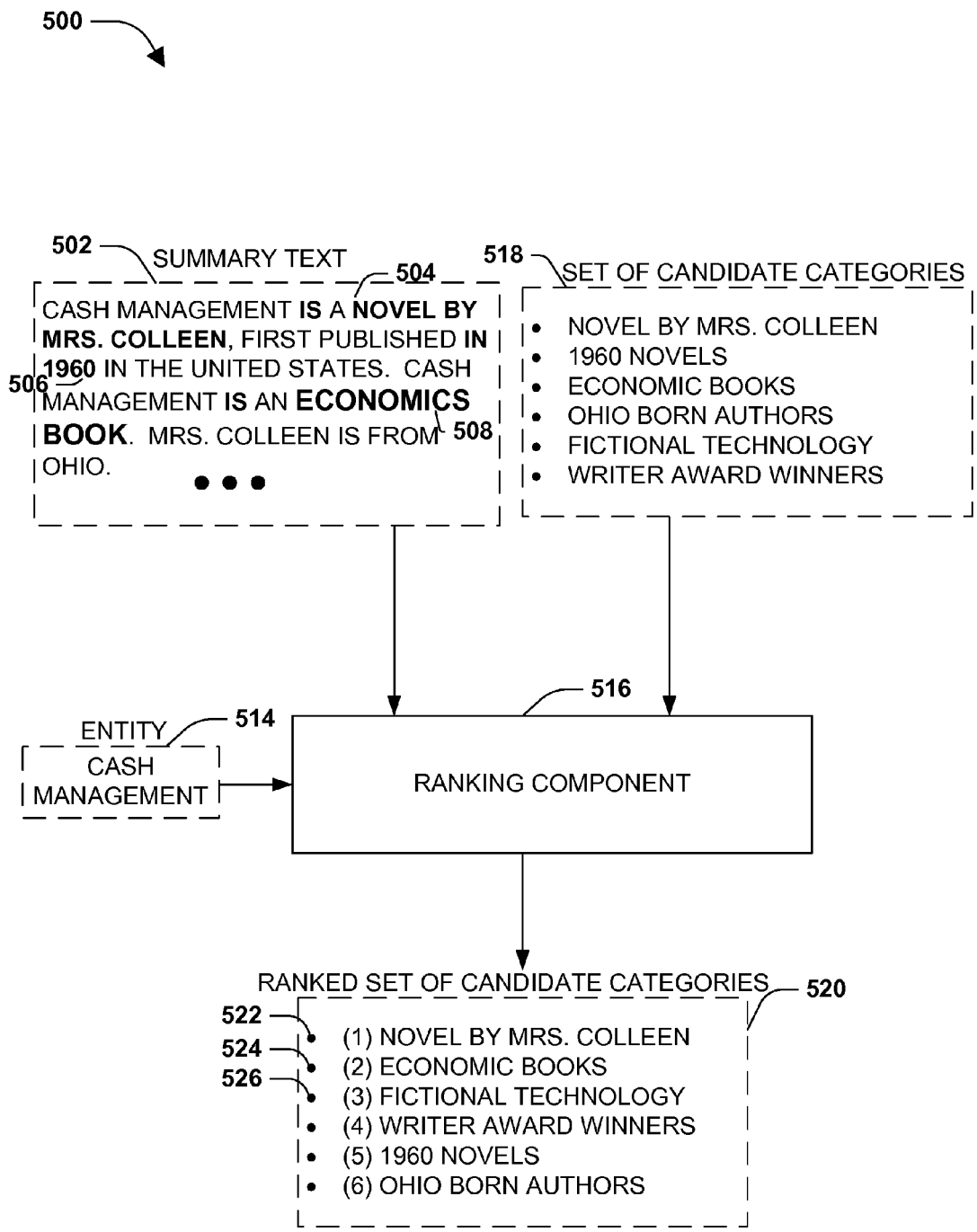
FIG. 5 is an illustration of an example of ranking a set of candidate categories to generate a ranked set of candidate categories corresponding to an entity.

FIG. 5 illustrates an example 500 of ranking a set of candidate categories 518 to generate a ranked set of candidate categories 520 corresponding to an entity Cash Management 514, where a ranking component 516 configured to perform this functionality is implemented to accomplish the same in this example. It may be appreciated that the set of candidate categories 518 may have been generated by a filtering component (e.g., filter component 418 generated the set of candidate categories 418 of FIG. 4). The ranking component may rank the set of candidate categories 518 based upon ranking features.

In one example, the ranking component 516 may rank a candidate category "novel by Mrs. Colleen" with a desired rank (e.g., a high rank) because candidate words of the candidate category "novel by Mrs. Colleen" occur after a verb "is" within summary text 502 (e.g., "is a novel by Mrs. Colleen" 504). The ranking component 516 may rank a candidate category "1960 novels" with an undesired rank (e.g., a medium/low rank) because candidate words of the candidate category "1960 novels" occur after a preposition "in" within the summary text 502 (e.g., "in 1960" 506).

The ranking component 516 may rank a candidate category "economic books" with a desired rank (e.g., a very high rank) because candidate words of the candidate category "economics books" occur after a verb "is" within summary text 502 and the candidate words have a large display size/font within the summary text 502 (e.g., "is an economics book" 508). In this way, the ranking component 516 may rank the set of candidate categories 518 to generate the ranked set of candidate categories 520. For example, the ranked set of candidate categories 520 may comprise "novel by Mrs. Colleen" having a highest rank 522, "economic books" having a second highest rank 524, "fictional technology" having a third highest rank 526, and/or other candidate categories having respective rankings.

Figure 6:
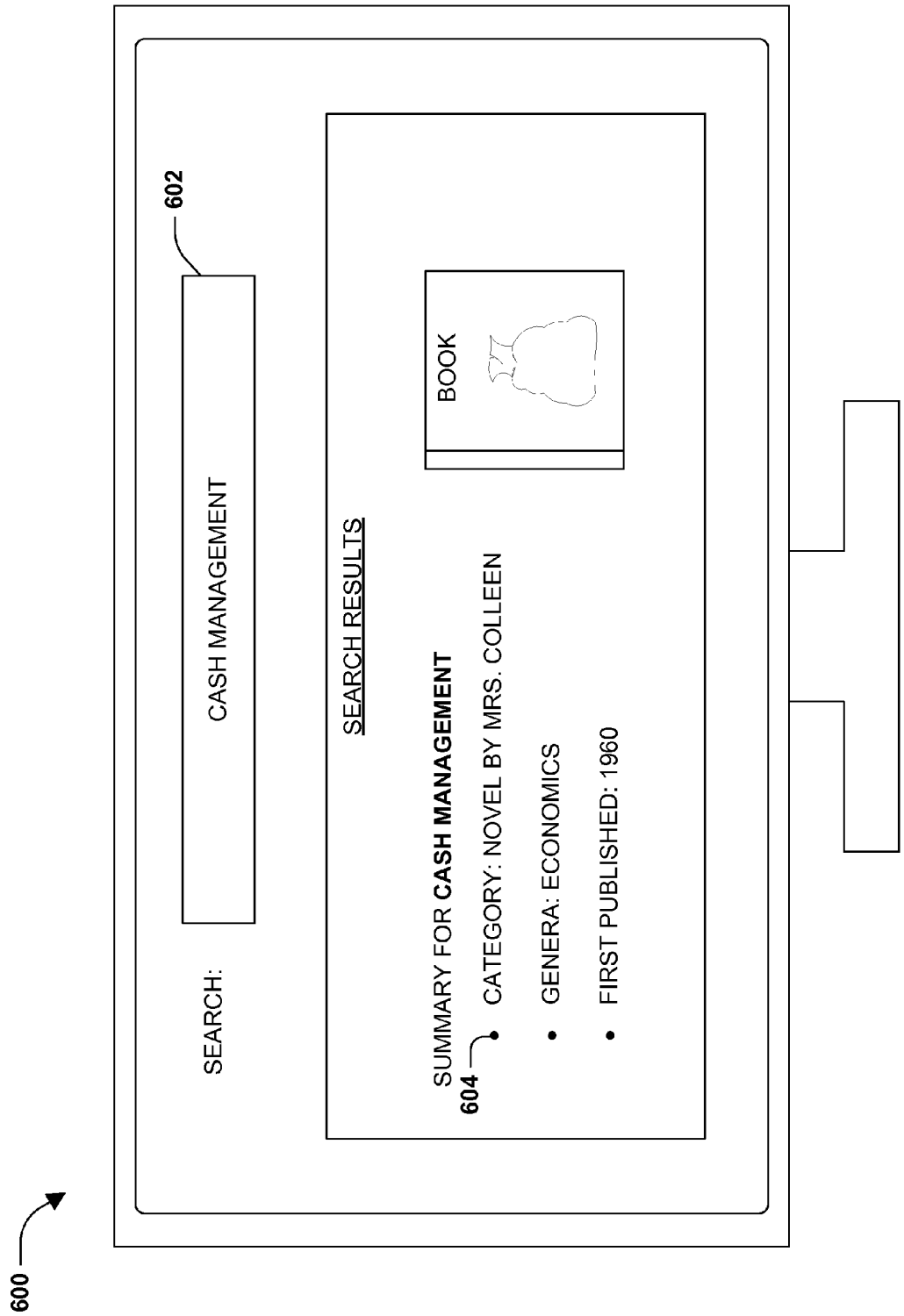
FIG. 6 is an illustration of an example of a search engine website presenting a summary comprising a category.

FIG. 6 illustrates an example 600 of a search engine website presenting a summary comprising a category 604. The search engine website may allow users to submit user search queries. In response to a user search query submission, the search engine website may return information relating to the user search query. In one example, a user may submit a user search query "Cash Management" 602 in an attempt to find additional information about a novel having a title "Cash Management". The search engine website may present search results comprising a summary of a "Cash Management" that the user may have desired. The user may quickly reference the summary to determine whether the search engine website returned search results relating to the correct "Cash Management" the user desired. For example, the category 604 "novel by Mrs. Colleen" may be presented within the summary, and this may give an indication that the correct/relevant search results were returned. It may be appreciated that the category 604 may have been determined using at least some of one or more of the techniques described herein (e.g., method 100 of FIG. 1 and/or system 200 of FIG. 2).

Figure 7:
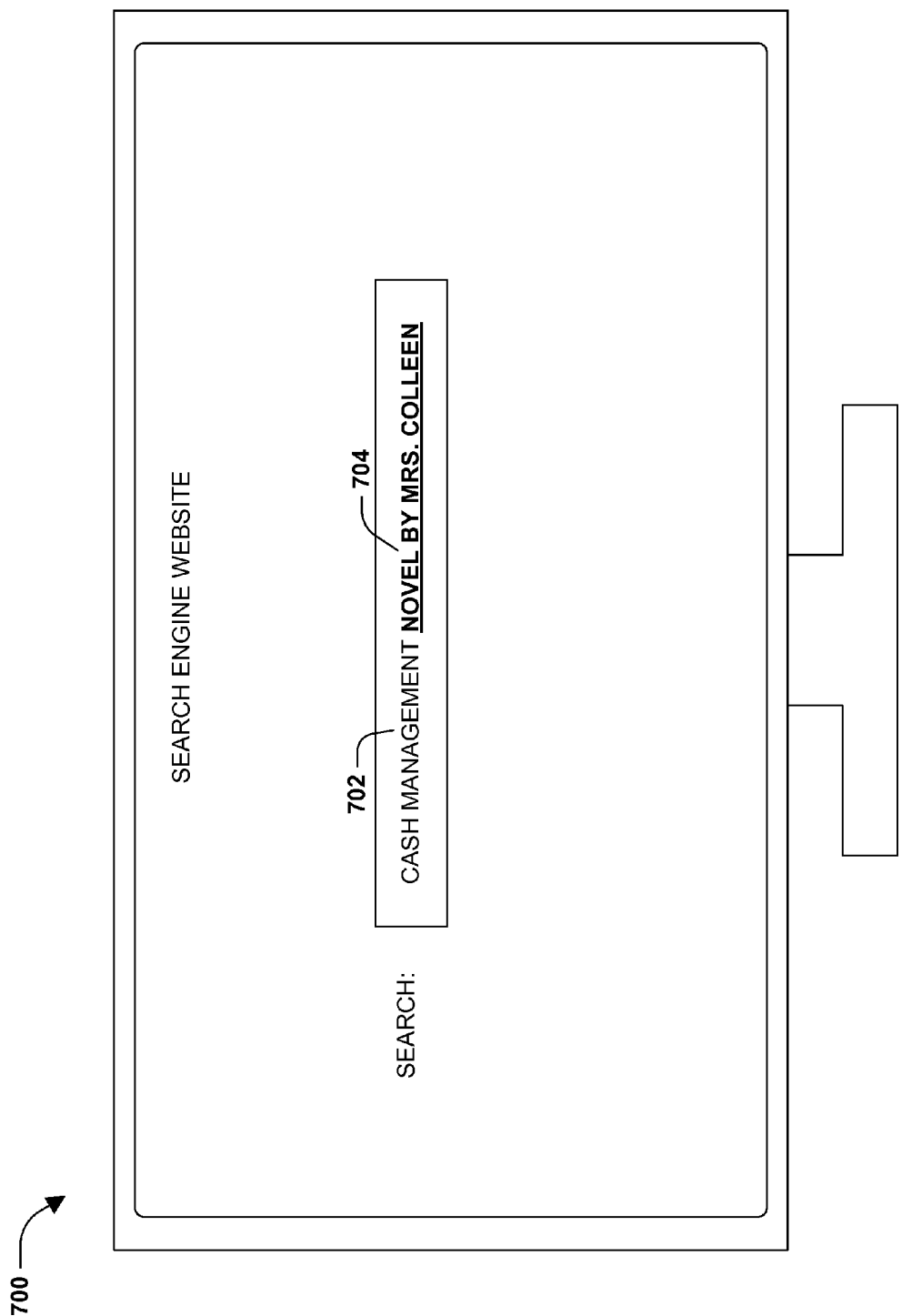
FIG. 7 is an illustration of an example of a search engine website providing a search query completion suggestion.

FIG. 7 illustrates an example 700 of a search engine website providing a search query completion suggestion 704. The search engine website may allow users to submit user search queries. To aid the user in submitting accurate user search queries, the search engine website may provide the user with the search query completion suggestion 704. For example, user may input "Cash Management" 702 into the search engine website. To aid the user in narrowing down the search to what "Cash Management" the user is referencing (e.g., multiple novels may be named "Cash Management", a movie may be named "Cash Management", etc.), the search query completion suggestion 704 may be presented. The search query completion suggestion 704 may correspond to a category previously determined for the entity "Cash Management". It may be appreciated that the category may have been determined using at least some of one or more of the techniques described herein (e.g., method 100 of FIG. 1 and/or system 200 of FIG. 2).

Figure 8:
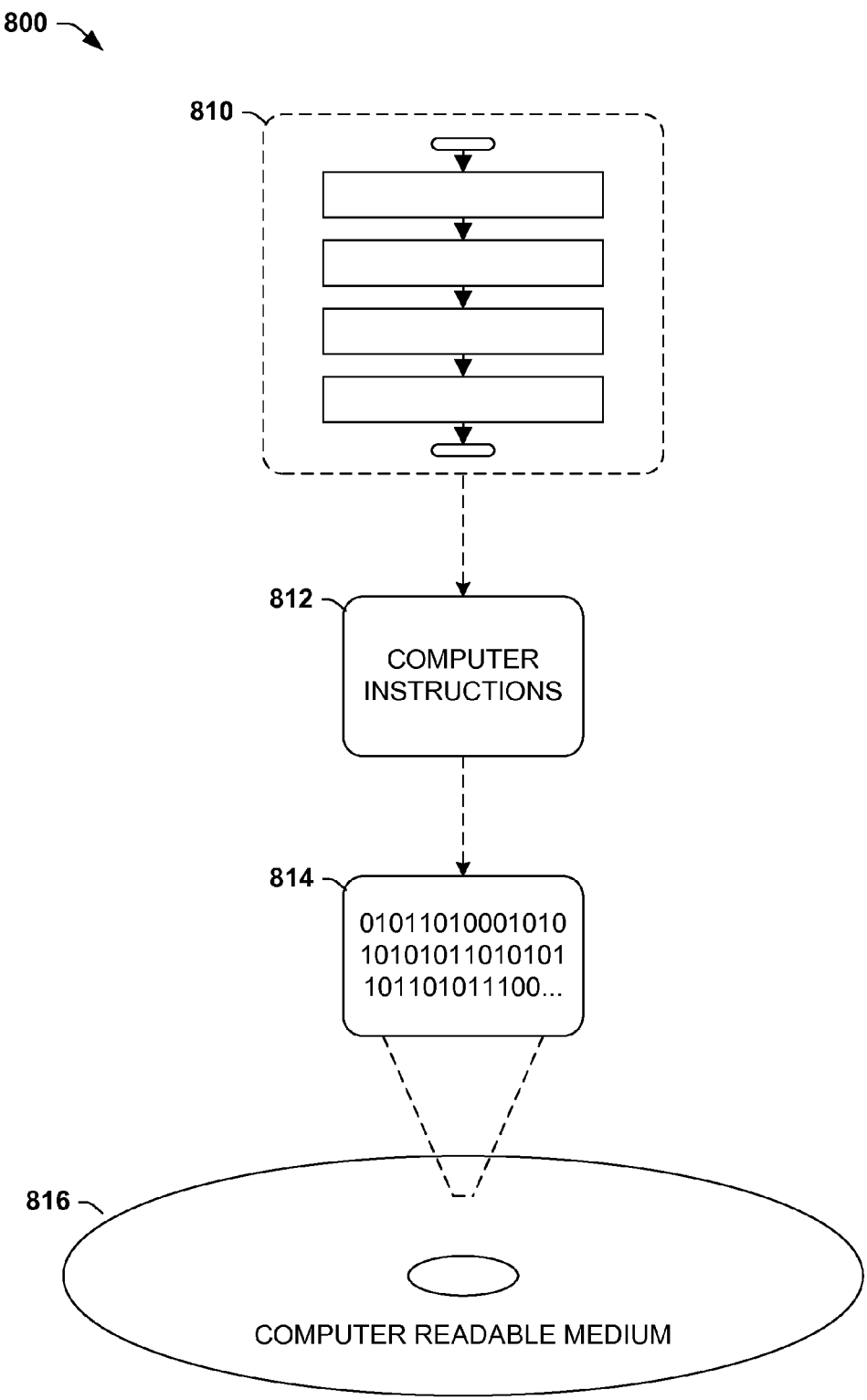
FIG. 8 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as the exemplary method 100 of FIG. 1, for example. In another such embodiment, the processor-executable instructions 812 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
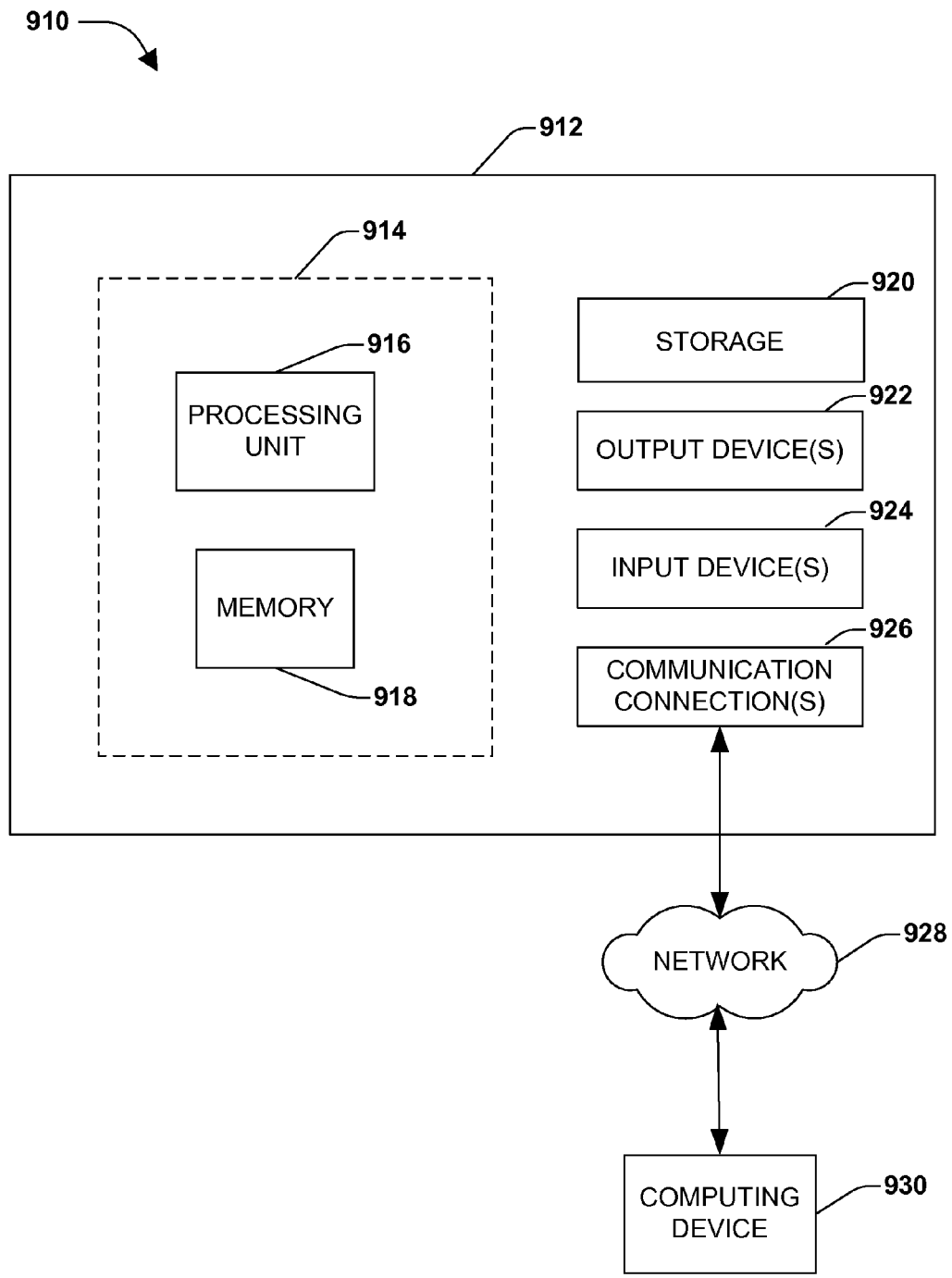
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-implemented method executed by a processing unit coupled to memory for determining an entity category for an entity, the entity comprising a subject of a web page, comprising:

extracting a set of potential categories relating to an entity, wherein the set of potential categories is extracted from a first portion of a web page and the entity comprises a subject of the web page;

extracting summary text relating to the entity from a second portion of the web page, wherein the first portion is disposed at a first region of the web page and the second portion is disposed at a second region of the webpage separate from the first region;

comparing at least some of the set of potential categories to the summary text to determine a set of candidate categories for the entity, wherein the set of candidate categories is a subset of the set of potential categories, and wherein the comparing includes A) performing a morphological analysis upon one or more category words of a potential category of the set of potential categories to generate a set of variation category words of the potential category, and B) identifying a match between one or more variation category words of the set of variation category words and one or more summary words of the summary text;

ranking a first candidate category of the set of candidate categories relative to a second candidate category of the set of candidate categories based upon one or more ranking features to generate a ranked set of candidate categories;

determining an entity category for the entity from the ranked set of candidate categories, wherein the entity category has a first rank within the ranked set of candidate categories, wherein the first rank is above a threshold; and presenting the entity category having the first rank in a search result page.

2. The computer-implemented method of claim 1, the presenting comprising:

presenting the entity category within the search result page in response to a user search query corresponding to the entity.

3. The computer-implemented method of claim 1, comprising:

providing the entity category as a search query completion suggestion in response to user input comprising at least part of a name of the entity.

4. The computer-implemented method of claim 1, wherein the web page comprises an encyclopedia type article about the entity.

5. The computer-implemented method of claim 1, the extracting a set of potential categories comprising:

extracting the set of potential categories from within a set of pre-labeled categories disposed at the first region of the web page.

6. The computer-implemented method of claim 1, the extracting summary text comprising:

extracting a first occurring sentence within the web page as the summary text.

7. The computer-implemented method of claim 1, the extracting summary text comprising:

extracting a first occurring paragraph within the web page as the summary text.

8. The computer-implemented method of claim 1, the comparing comprising:

identifying a second match between one or more category words of a second potential category of the set of potential categories and one or more summary words of the summary text; and identifying the second potential category as the first candidate category responsive to the identifying a second match.

9. The computer-implemented method of claim 1, the comparing comprising:
 determining one or more syntactical features of the summary text based upon at least one of a part-of-speech tagging, phrase chunking, or a natural-language processing technique; and
 excluding a second potential category of the set of potential categories from the set of candidate categories based upon the one or more syntactical features.

10. The computer-implemented method of claim 1, the ranking comprising:
 ranking the first candidate category relative to the second candidate category based upon one or more category words of the first candidate category immediately following a verb within the summary text.

11. The computer-implemented method of claim 1, the ranking comprising:
 assigning a second rank to a third candidate category of the set of candidate categories based upon one or more category words of the third candidate category immediately following a preposition within the summary text, wherein the second rank is below the threshold.

12. The computer-implemented method of claim 1, wherein the one or more ranking features correspond to at least one of a position within summary text feature or a display size feature.

13. A computer-implemented system for determining an entity category for an entity, the entity comprising a subject of a web page, comprising: an extraction component configured to:
 extract a set of potential categories relating to an entity, wherein the set of potential categories is extracted from a first portion of a web page and the entity comprises a subject of the web page; and
 extract summary text relating to the entity from a second portion of the web page, wherein the first portion is disposed at a first region of the web page and the second portion is disposed at a second region of the web page separate from the first region;
 a filtering component configured to:
 compare at least some of the set of potential categories to the summary text to determine a set of candidate categories for the entity, wherein the set of candidate categories is a subset of the set of potential categories, and wherein compare includes
  A) perform a morphological analysis upon one or more category words of a potential category of the set of potential categories to generate a set of variation category words of the potential category, and
  B) identify a match between one or more variation category words of the set of variation category words and one or more summary words of the summary text;
 a ranking component configured to:
 rank a first candidate category of the set of candidate categories relative to a second candidate category of the set of candidate categories based upon one or more ranking features to generate a ranked set of candidate categories; and
 determine an entity category for the entity from the ranked set of candidate categories, wherein the entity category has a first rank within the ranked set of candidate categories, wherein the first rank is above a threshold; and
 a presentation component configured to:
 present the entity category having the first rank in a search result page.

14. The computer-implemented system of claim 13, the filtering component configured to:
 determine one or more syntactical features of the summary text based upon at least one of a part-of-speech tagging, phrase chunking, or a natural-language processing technique; and
 exclude a second potential category of the set of potential categories from the set of candidate categories based upon the one or more syntactical features.

15. The computer-implemented system of claim 13, the ranking component configured to:
 rank the first candidate category relative to the second candidate category based upon one or more category words of the first candidate category immediately following a verb within the summary text.

16. The computer-implemented system of claim 13, the ranking component configured to:
 assign a second rank to a third candidate category of the set of candidate categories based upon one or more category words of the third candidate category immediately following a preposition within the summary text, wherein the second rank is below the threshold.

17. The computer-implemented system of claim 13, the presentation component configured to:
 present the entity category in response to user input comprising at least part of a name of the entity.

18. A computer readable storage device comprising instructions that when executed perform a method for determining an entity category for an entity, the entity comprising a subject of a web page, comprising:
 extracting a set of potential categories relating to an entity, wherein the set of potential categories is extracted from a first portion of a web page and the entity comprises a subject of the web page;
 extracting summary text relating to the entity from a second portion of the web page, wherein the first portion is disposed at a first region of the web page and the second portion disposed at a second region of the web page separate from the first region;
 comparing at least some of the set of potential categories to the summary text to determine a set of candidate categories for the entity, wherein the set of candidate categories is a subset of the set of potential categories, and wherein the comparing includes
  A) performing a morphological analysis upon one or more category words of a potential category of the set of potential categories to generate a set of variation category words of the potential category, and
  B) identifying a match between one or more variation category words of the set of variation category words and one or more summary words of the summary text;
 ranking a first candidate category of the set of candidate categories relative to a second candidate category of the set of candidate categories based upon one or more ranking features to generate a ranked set of candidate categories;
 determining an entity category for the entity from the ranked set of candidate categories, wherein the entity category has a first rank within the ranked set of candidate categories, wherein the first rank is above a threshold; and
 presenting the entity category having the first rank in a search result page.

* * * * *